(12) United States Patent
Bercy, Sr.

(10) Patent No.: US 8,242,360 B2
(45) Date of Patent: Aug. 14, 2012

(54) ELECTRICAL JUNCTION BOX

(76) Inventor: Rowland Bercy, Sr., New Orleans, LA (US)

( * ) Notice: Subject to any disclaimer, the term of this patent is extended or adjusted under 35 U.S.C. 154(b) by 257 days.

(21) Appl. No.: 12/802,071

(22) Filed: May 29, 2010

(65) Prior Publication Data

US 2011/0290518 A1    Dec. 1, 2011

(51) Int. Cl.
*H02G 3/08* (2006.01)
(52) U.S. Cl. ............. 174/50; 174/58; 439/535; 248/906
(58) Field of Classification Search ..................... 174/50, 174/58; 439/535; 220/3.3, 4.02; 248/906
See application file for complete search history.

(56) References Cited

U.S. PATENT DOCUMENTS

| | | | |
|---|---|---|---|
| 916,436 | A | 3/1909 | Greenfield |
| 4,083,314 | A | 4/1978 | Garvin |
| 4,263,472 | A * | 4/1981 | Maheu ............................ 174/51 |
| 4,638,963 | A | 1/1987 | Hernandez |
| 5,221,814 | A | 6/1993 | Colbaugh et al. |
| 5,478,032 | A | 12/1995 | Miller |
| 6,170,685 | B1 * | 1/2001 | Currier ......................... 220/3.3 |
| 7,300,025 | B2 | 11/2007 | Korez |
| 7,667,136 | B2 * | 2/2010 | Dinh et al. ...................... 174/58 |

* cited by examiner

*Primary Examiner* — Dhirubhai R Patel

(57) ABSTRACT

An electrical junction box adapted for mounting on a drywall without attachment to a stud. The junction box carries four tabs that pivotally move between a retracted position inside the junction box and an extended position extending through respective slots formed in the junction body sidewalls. The tabs are turned by a turning screw into a position contacting the drywall. A pair of flange members is secured to a front edge of the box for engaging the interior surface of the drywall. The tabs and the flanges support the weight of the junction box on the drywall.

7 Claims, 3 Drawing Sheets

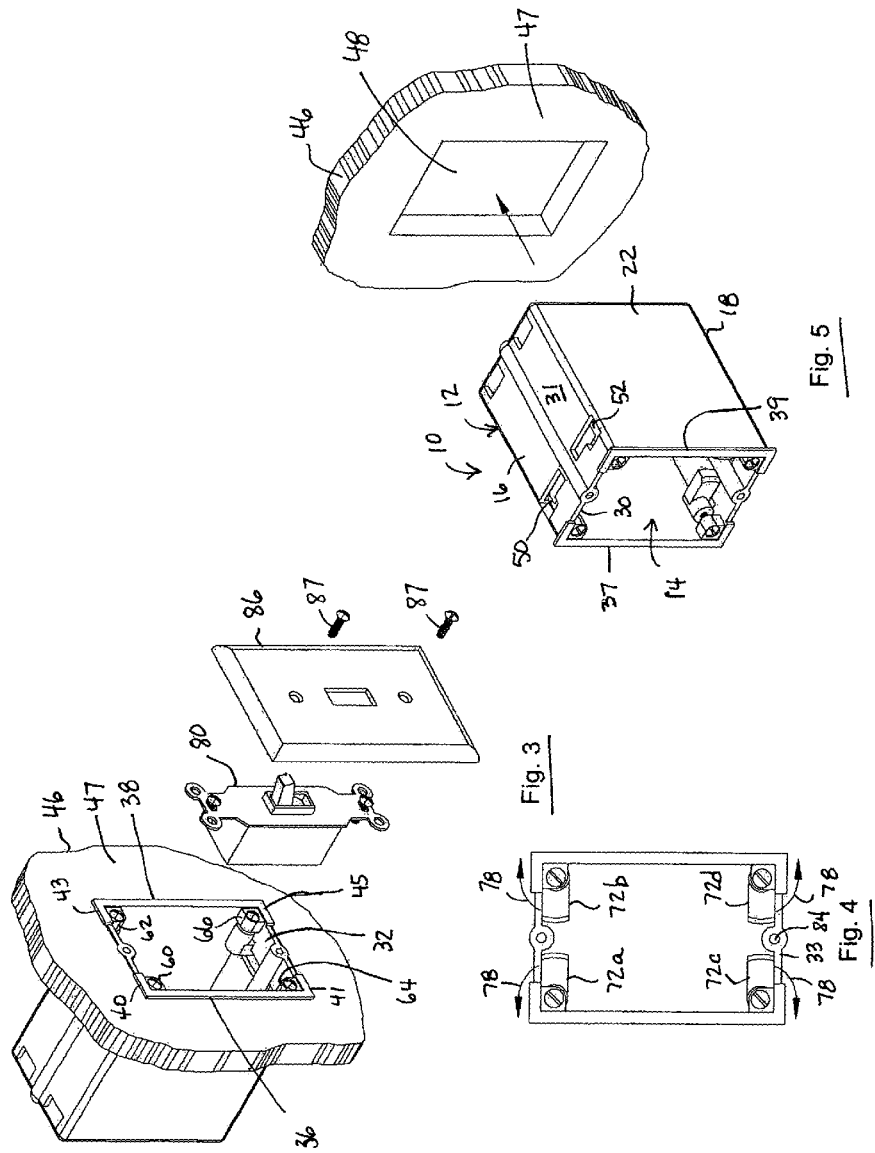

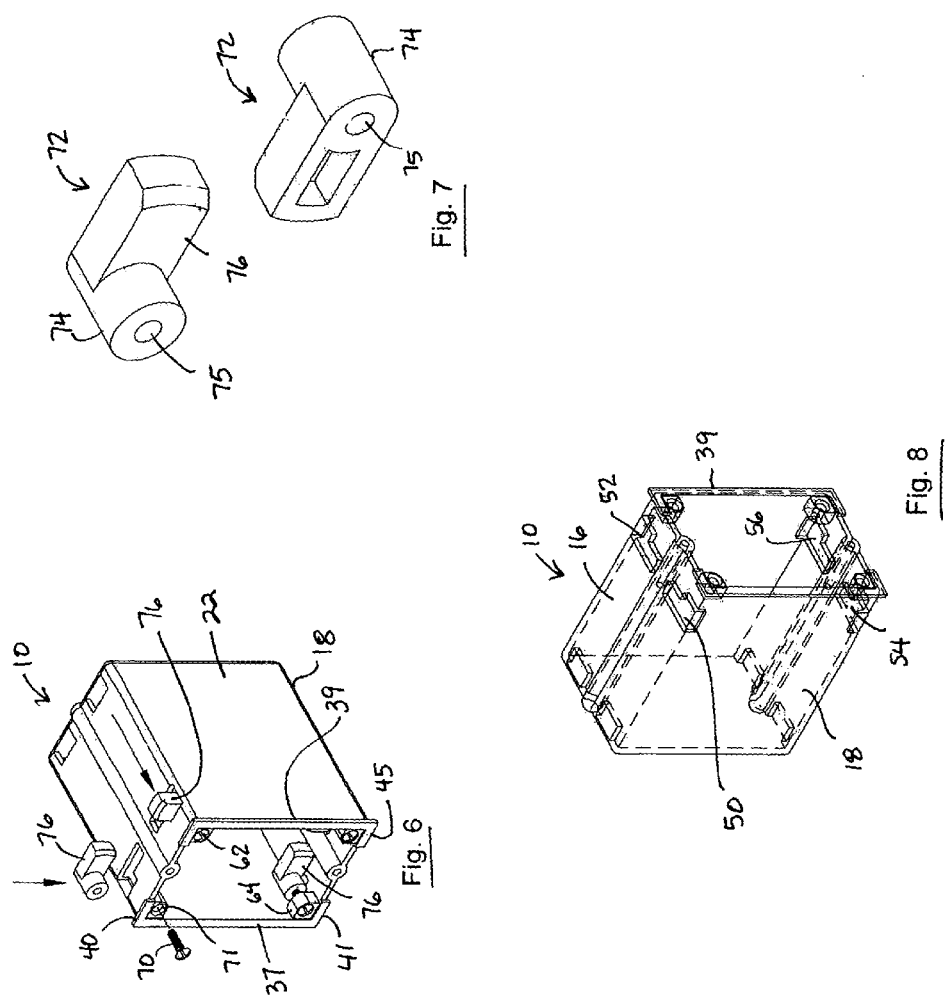

ELECTRICAL JUNCTION BOX

BACKGROUND OF THE INVENTION

The present invention relates generally to electrical wiring systems and devices, and more particularly to an electrical receptacle and electrical junction box, which is positioned in a wall of a building for providing electrical connections for switches, outlet plates and the like. Conventionally, junction boxes are installed in a building at the time of the building construction. Such boxes are attached to the building structure, studs or other vertical supports that are later covered by interior walls made of sheetrock and similar materials. Once the dry walls are in place, it becomes difficult and time-consuming to provide any additional junction boxes. Usually, a drywall technician must be called to cut an opening in the drywall adjacent a stud so that a replacement or additional outlet box can be placed therein.

The problem is exacerbated when a building owner needs a junction box in a location between the studs. Depending on the spacing of the vertical supports, the desired position of a new junction box may be a distance from the vertical support. In the event that a junction box must be positioned in that particular location, this usually means breaking a part of the sheetrock or drywall for access to the space between the walls, installing a new box, securing a new outlet box on the drywall, reshaping and sneaking the wires into the new box. The drywall must then be repaired with taping, sanding, priming and painting with the least damage to the wall.

The main problem with installing a junction box unattached to a stud is ensuring its position on the drywall. Since the new junction box is supported only by a sheetrock layer, which is prone to crumbling, the technician must be careful to properly support the junction box on the wall.

The construction industry developed a number of mounting devices that are designed to support a junction box on a drywall. One of such devices provides for the use of a pair of clamps that are pulled against the back of the drywall by tightening the screws. The clamps are positioned at diagonally opposite locations on the body of the junction box. Another suggestion is to use a separate mounting bracket that is attached to a junction box.

Still another approach is disclosed in U.S. Pat. No. 6,346,674 issued on Feb. 12, 2002 to Thomas J. Gretz for a "Mounting Device." In that patent, the flags are located on opposite ends of the open front surface of an electrical box near the center of the two opposite ends so that holding forces are applied in the desired direction without having such forces applied at opposite corners.

While these technical solutions may function under certain conditions, there exists a need to provide a junction box that has built-in tabs for engaging the back of a drywall without the need to attach the junction box to a stud.

SUMMARY OF THE INVENTION

It is, therefore, an object of the present invention to provide an electric junction or outlet box that can be positioned in a drywall opening.

It is another object of the invention to provide an electric junction box that has wall-engaging tabs that share the loads of a cantilevered junction box.

These and other objects of the invention are achieved through a provision of an electrical junction box apparatus adapted for mounting in an opening formed in a drywall and be supported therein without attachment to a stud. The junction box has a hollow body having an opening defined by an upper sidewall, a bottom sidewall, a left sidewall and a right sidewall. A pair of spaced-apart slots is formed in the top side and the bottom side.

A plurality of tabs is secured inside the hollow body, each of the tabs being configured to pivotally move between a retracted position inside the hollow body and an extended position extending, at least in part, through a corresponding slot formed in the upper side and the bottom side. A pair of transverse flange members is secured to a front edge of the body, the flange members being configured to contact the interior surface of the drywall when the hollow body is mounted in an opening formed in the drywall.

Mounting blocks secured inside the body allow a turning screw to freely pass therethrough and engage the tabs. Turning of the screws causes pivotal movement of the tabs into the extended position.

BRIEF DESCRIPTION OF THE DRAWINGS

Reference will now be made to the drawings, wherein like parts are designated by like numerals, and wherein.

FIG. 3 is an exploded view of the junction box with a switch and wall plate.

FIG. 4 is a front view of the junction box.

FIG. 5 illustrates the junction box to be inserted into a wall opening.

FIG. 6 is a perspective view of the junction box showing positioning of one of the tabs.

FIG. 7 is a perspective front and back view of a tab.

FIG. 8 is a plan view of the junction box.

DETAIL DESCRIPTION OF THE INVENTION

Figure 2:
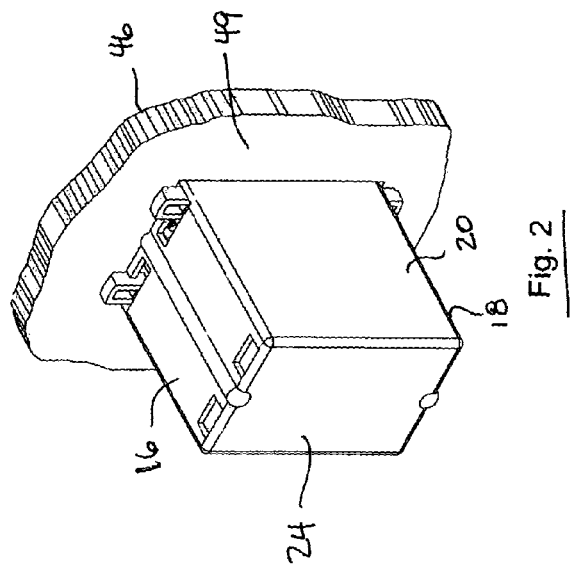
FIG. 2 is a perspective rear view of the junction box of the present invention showing the tabs engaged with a drywall.

Turning now to the drawings in more detail, numeral 10 designates the junction box of the present invention. The junction box or outlet box 10 comprises a hollow body 12 having an opening 14 defined by an upper side 16, a bottom side 18, a left side 20 and a right side 22. The body 12 of the junction box 10 has a generally parallelepiped-shaped configuration, although other shapes can be used, if desired. The junction box 10 has a rear side 24. The upper side 16 has an inner surface 30 and an outer surface 31. The lower side 18 has an inner surface 32 and an outer surface 33.

The sides 16, 18, 20 and 22 each have a front edge and a pair of U-shaped flanges 36 and 38 is secured to the front edges. The flanges 36, 38 extend at substantially right angle in relation to the sides of the body 12.

A longer central portion 37 of the flange 36 extends along the front edge of the left side 20. Shorter end portions 40, 41 of the flange 36 are secured and extend along a part of the upper side 16 and lower (bottom) side 18, respectively. A longer central portion 39 of the flange 38 extends along the front edge of the right side 22, while the shorter end portions 43, 45 extend along a part of the upper side 16 and lower side 18, respectively. The flanges 36 and 38 are configured to engage an interior surface 47 of the wall 46 when the junction box 10 is installed in an opening 48 formed in the drywall 46.

A pair of L-shaped spaced-apart slots 50, 52 is formed in the upper side 16 a distance from the front edge of the sides of the body 12. A similar pair of L-shaped slots 54, 56 is formed in the bottom side 18 of the body 12. The slot 50 is aligned with the oppositely formed slot 54, and the slot 52 is aligned with the oppositely formed slot 56.

A pair of mounting blocks 60, 62 is secured on the inner surface 30 of the upper side 16. The mounting blocks 60, 62 are positioned adjacent the slots 50, 52, respectively. A similar pair of mounting blocks 64, 66 is secured on the inner surface 33 of the bottom side 18. The mounting blocks 64, 66 are positioned adjacent the bottom slots 54, 56, respectively. Each of the mounting blocks 60, 62, 64, and 66 comprises a hollow cylindrical member configured to receive a turning screw 70 therein.

Each of the slots 50, 52, 54, and 56 is configured to receive a tab 72 therethrough. As can be seen in detail in FIG. 7, the tab 72 comprises an L-shaped member having a first cylindrical part 74 and a second part 76 unitary formed with the first part 74 and extending at a right angle to the first part 72. The second part 76 is configured to extend through a respective slot L-shaped 50, 52, 54, or 56 when the tab 72 is turned into a wall-engaging position.

The first part 74 of the tab 72 is provided with a through opening 75, which is sized and shaped to frictionally engage the turning screw 70. As can be seen in FIGS. 4, 5, and 6, the junction box 10 comprises four tabs 72a, 72b, 72c, and 72d. In a retracted position, the tabs 72a, 72b, 72c, and 72d are positioned inside the body 12, with the second part 76 of the tab 72 fitted in alignment with the respective slots 50, 52, 54, and 56.

In a retracted position, the first part 74 of the tabs 72a, 72b, 72c, and 72d is fitted inwardly in the body 12 and abuts the mounting blocks 60, 62, 64, and 66, respectively, while the turning screw 70 freely passes through the opening 71 formed in the mounting blocks and frictionally fits into the opening 75 formed in the first part 74 of the tab 72. Turning or tightening of the turning screw 70 causes pivotal movement of the tabs 72a, 72b, 72c, and 72d, in the direction shown by arrows 78 in FIG. 4. As a result of limited rotation of the first part 74 the second part 76 of the tab 72 passes through the respective slots 50, 52, 54, and 56 outwardly of the body 12 into a position shown in FIGS. 2 and 6.

To position the device 10 the technician first cuts a rectangular opening 48 in the drywall 46. The junction box 10 is inserted into the opening 48 and the four turning screws 70 are turned clockwise and counterclockwise, as shown by arrows 78 to flip the tabs 72 40 into position extending through the slots 50, 52, 54, and 56. As the turning screws 70 continue to turn, they draw the second parts 76 to the outer surface 49 of drywall 46 to hold the junction box 10 firmly in position. The flanges 36 and 38 press against the interior surface 47 of the drywall 46 supporting the cantilevered junction box 10 in the opening 48.

The tabs 72a, 72b, 72c, and 72d as well as the flanges 36, 38 support the full weight of the junction box 10 without the need to attach the junction box to a stud.

Figure 1:
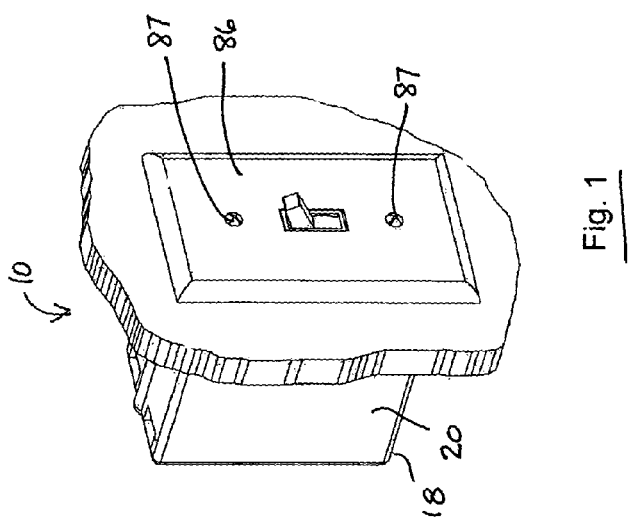
FIG. 1 is a perspective view of the junction box of the present invention installed on a drywall for providing electrical connection to a switch.

After the junction box 10 has been firmly fixed in position, various other device holders may be electrically connected to the building electric circuitry. In the example shown in FIGS. 1 and 3, a conventional switch device 80 is screwed into holes 82, 84 (FIG. 4) defined by the junction box 10. Overlaying the mounted device is a cover plate 86 that is held in position by screws 87. 56. Other similar devices may also be mounted as the switch 86 is merely representative of one type.

The present invention offers the simplicity of manufacture, safety and ease of installation for a new or replacement outlet box. A variety of electrical connections can be run to the new junction box without the need to find a stud or other vertical support in the building structure.

Many changes and modifications can be made in the design of the present invention without departing from the spirit thereof. I, therefore, pray that my rights to the present invention be limited only by the scope of the appended claims.

I claim:

1. An electrical junction box apparatus adapted for mounting on a drywall having an outer surface and an interior surface, the apparatus comprising:
    a hollow body having an opening defined by an upper side, a bottom side, a left side and a right side, said upper side and said bottom side being each provided with a pair of spaced apart slots;
    a pair of tabs secured on a corner of the upper side and bottom side of the hollow body, each of the tabs having a first cylindrical part and a second part unitarily formed with the first part and extending at right angles to the first part and having an opening there through a turning or tightening screw through the opening can be frictionally engaged to pivotally move between a retracted position inside the hollow body and an extended position extending, at least in part, through one of the pair of corresponding slots formed in the upper side and the bottom side; and
    a pair of transverse flange members secured to a front edge of the body, said flange members being configured to contact the interior surface of the drywall when the hollow body is mounted in an opening formed in the drywall.

2. The apparatus of claim 1, wherein said pair of tabs are being configured to contact the outer surface of the drywall when the box is mounted on the drywall and the tabs are in the extended position.

3. The apparatus of claim 1, wherein each of said flange members has a generally U-shaped configuration having a longer central portion and a pair of shorter end portions.

4. The apparatus of claim 3, wherein the central portions of the pair of flange members extend along the left side and the right side of the body, while the end portions of the pair of flange members extend along the upper side and the bottom side of the body.

5. The apparatus of claim 1, wherein each of said slots has a generally L-shaped configuration, and wherein each of said tabs has the first part secured in the hollow body and the second part configured to extend through a respective pair of slots.

6. The apparatus of claim 1, wherein each of said tabs has a generally L-shaped configuration.

7. The apparatus of claim 1, further comprising a plurality of mounting blocks positioned in said body in contact with the tabs, and wherein the turning screw extends through an opening of each of the mounting blocks and a part of one of the tabs.

* * * * *